Dec. 26, 1950     C. E. MOSMAN     2,535,591
POLARIZING LENS SYNCHRONIZER FOR CAMERAS
Filed June 13, 1947
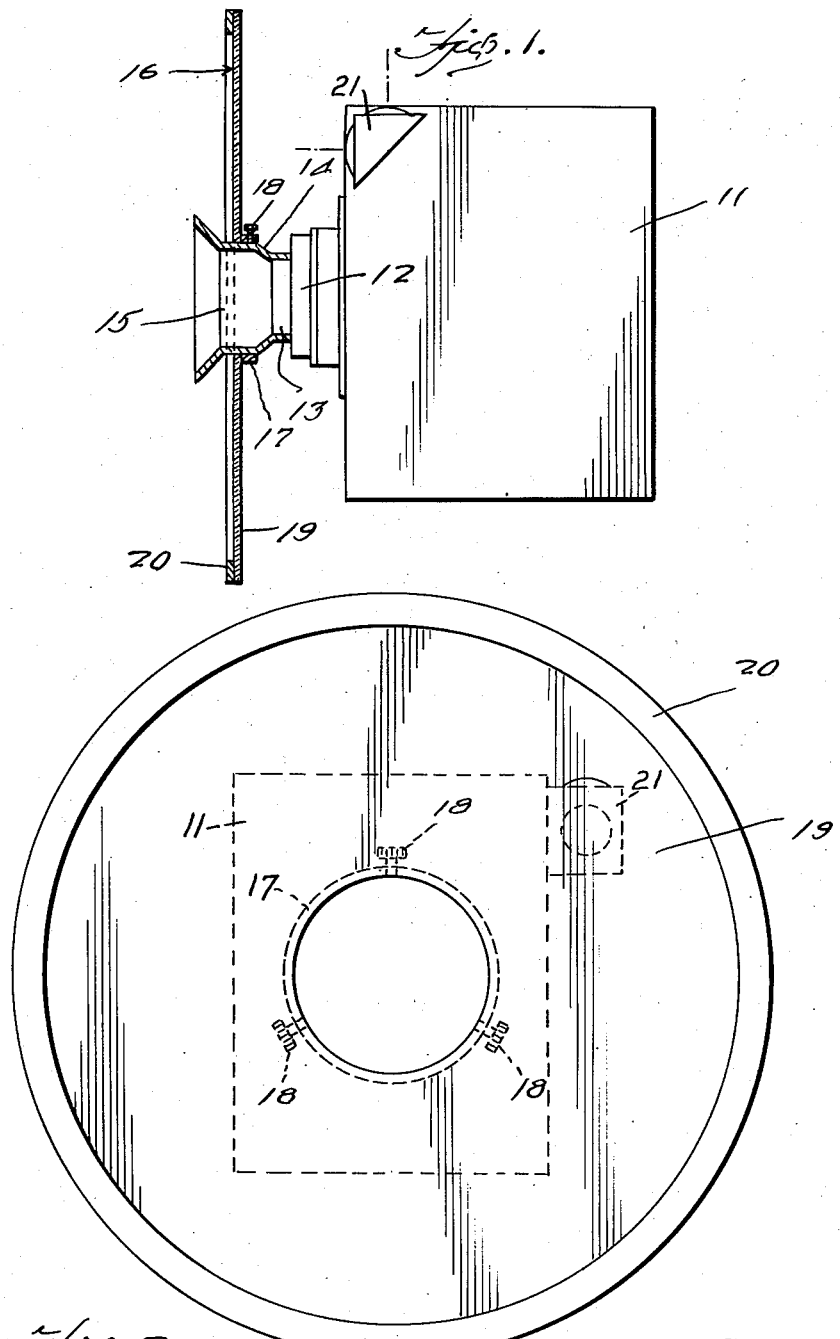
INVENTOR.
Charles E. Mosman
BY
McMorrow, Berman & Davidson
ATTORNEYS Patented Dec. 26, 1950

2,535,591

UNITED STATES PATENT OFFICE 2,535,591

POLARIZING LENS SYNCHRONIZER FOR CAMERAS

Charles E. Mosman, New Preston, Conn.

Application June 13, 1947, Serial No. 754,474

1 Claim. (Cl. 95—64)

This invention relates to cameras and more particularly to means for eliminating glare and disturbing light reflections when taking photographic pictures.

A main object of the invention is to provide a novel and improved device for regulating the adjustment of a polarizing lens employed with a camera to reduce glare and undesired reflections in the photograph being taken, said regulating device being very simple in construction, easy to install and efficient in operation.

A further object of the invention is to provide an improved device for establishing the optimum position of adjustment of the polarizing lens of a camera, said device being inexpensive to manufacture, easy to operate and readily mounted on and detached from the camera.

Further objects and advantages of the invention will become apparent from the following description and claim, and from the accompanying drawings, wherein:

Figure 1 is a side elevational view of a camera provided with a polarizing lens and having mounted thereon a synchronizing device for said lens according to the present invention.

Figure 2 is an enlarged front elevational detail view of the polarizing lens synchronizing device employed in the structure of Figure 1.

Referring to the drawings, 11 designates a conventional camera provided with a focussing lens structure 12 having a forwardly projecting barrel portion 13. Rotatably mounted on barrel portion 13 is a lens barrel 14 containing a polarizing lens 15 which is employed for reducing glare and for eliminating disturbing light reflections from the scene being photographed, in a manner well known in the art. In order to minimize the undesired glare and reflections the polarizing lens 15 must be rotated to an optimum position of adjustment of its polarizing axis with respect to the scene being photographed, and this is done by rotating barrel 14 on the projecting barrel portion 13 of the focussing lens structure 12.

In order to determine the optimum position of adjustment of the polarizing lens 15 I provide a synchronizing member 16 which comprises a collar 17 adapted to fit on barrel 14 and be secured thereto by set screws 18 threaded through the collar 17 and engaging the barrel 14. Secured concentrically to collar 17 is a large disc 19 of polarizing material to the periphery of which is secured a stiffening ring 20 of any suitable rigid material. The disc 19 is large enough so that it is possible for the photographer to view the scene directly through said disc or through the view finder of the camera. The polarizing axis of disc 19 is aligned by any suitable means, such as by registering index marks or the like with the polarizing axis of the polarizer lens 15.

When the focussing mechanism 12 has been properly adjusted and the scene is ready to be photographed, the photographer views the scene through disc 19 and rotates said disc until the optimum condition of elimination of glare and undesirable light reflections has been obtained. Since polarizer lens barrel 14 is fixed to member 16 by the set screws 18, the polarizing lens 15 is simultaneously rotated to its optimum position of orientation. The photograph may then be taken.

The photographer may also view the scene through the view finder or range finder 21 of the camera, the disc 19 being large enough in diameter so that it is interposed between the scene and said viewing elements.

While a specific embodiment of a polarizing lens synchronizing device for camera has been disclosed in the foregoing description, it will be understood that various modifications within the spirit of the invention may occur to those skilled in the art. Therefore, it is intended that no limitations be placed on the invention other than as defined by the scope of the appended claim.

What is claimed is:

In connection with a camera having a view finder a lens barrel rotatably mounted on the focusing lens-supporting structure thereof and axially aligned with the focusing lens thereon, and a light-polarizing lens mounted in said barrel, the features including a disc member of light-polarizing material which is formed with a central aperture adapted to fit on said lens barrel, a collar secured to said disc member around said aperture and concentrically with the periphery thereof, a plurality of set screws threaded through said collar and engageable with said lens barrel when the disc member is mounted thereon in order to lock the disc member to said barrel in predetermined rotated position of said disc member with respect to the barrel, whereby the polarizing axes of the disc member and lens may initially be brought into and secured in alignment with respect to each other and the lens and disc member may thereafter be rotated as a unit about said axes upon rotary adjustment of the disc member and a ring of relatively stiff material secured to the peripheral portion of said disc member to reinforce the latter, said disc member being of relatively large diameter so that it projects in overlying relation with respect to said view finder and substantially beyond the longitudinal wall planes of the camera.

CHARLES E. MOSMAN.

REFERENCES CITED

The following references are of record in the file of this patent:

UNITED STATES PATENTS

| Number | Name | Date |
|---|---|---|
| 2,132,683 | Farmen | Oct. 11, 1938 |
| 2,152,513 | West | Mar. 28, 1939 |
| 2,153,132 | Crowther | Apr. 4, 1939 |
| 2,169,688 | Frotschner | Aug. 15, 1939 |
| 2,184,015 | McFarlane | Dec. 19, 1939 |
| 2,190,718 | Kuppenbender | Feb. 20, 1940 |
| 2,210,882 | Carter | Aug. 13, 1940 |